United States Patent [19]

Portin

[11] Patent Number: 5,794,159
[45] Date of Patent: Aug. 11, 1998

[54] DUAL BAND MOBILE STATION EMPLOYING CROSS-CONNECTED TRANSMITTER AND RECEIVER CIRCUITS

[75] Inventor: Jyrki Portin, Oulu, Finland

[73] Assignee: Nokia Mobile Phones Limited, Salo, Finland

[21] Appl. No.: 695,234

[22] Filed: Aug. 7, 1996

[51] Int. Cl.[6] .................................................. H04B 1/40
[52] U.S. Cl. .......................... 455/553; 455/301; 361/814
[58] Field of Search .................................. 475/552, 553, 475/575, 74, 76, 83, 84, 87, 88, 132, 140, 141, 143, 300, 301, 117, 63, 572, 343; 375/216; 361/736, 737, 748, 784, 800, 814, 816, 818

[56] References Cited

U.S. PATENT DOCUMENTS

| | | | |
|---|---|---|---|
| 3,754,170 | 8/1973 | Tsuda et al. | 455/301 |
| 4,658,439 | 4/1987 | Danielsen et al. | 455/301 |
| 4,802,235 | 1/1989 | Treatch | 455/552 |
| 5,020,147 | 5/1991 | Okanobu | 455/143 |
| 5,291,474 | 3/1994 | Ikonen et al. | 455/76 |
| 5,301,367 | 4/1994 | Heinonen | 455/76 |
| 5,309,502 | 5/1994 | Hirai | 455/552 |
| 5,390,168 | 2/1995 | Vimpari | 455/76 |
| 5,422,931 | 6/1995 | Austin-Lazarus et al. | 455/553 |
| 5,471,652 | 11/1995 | Hulkko | 455/76 |
| 5,519,885 | 5/1996 | Vaisanen | 455/76 |
| 5,535,432 | 7/1996 | Dent | 455/552 |
| 5,584,056 | 12/1996 | Kim | 455/572 |
| 5,628,058 | 5/1997 | Hiraki | 455/300 |
| 5,649,308 | 7/1997 | Andrews | 455/84 |

FOREIGN PATENT DOCUMENTS

WO 93/16560  8/1993  WIPO.

OTHER PUBLICATIONS

GSM and Dect –A Dual Mode Solution, Mobile Communications International, B. Rashidzadan et al., Apr. 1995, pp. 57–60.

High Frequency Part of a Real Time Test Mobile Station For UMTS System Evaluations, Conference Proceedings, K. Lehtinen et al., 5–8 Sep. 1994, vol. 2, 1575–1580.

*Primary Examiner*—Nguyen Vo
*Assistant Examiner*—Lester G. Kincaid
*Attorney, Agent, or Firm*—Perman & Green, LLP

[57] ABSTRACT

A multi-mode radiotelephone (10) includes at least one antenna (12) for transmitting and receiving RF signals within at least two frequency bands. The radiotelephone also includes a first receiver (30, 34) having an input coupled to the antenna for amplifying and down-converting RF signals within a first frequency band and a second receiver (30a, 34a) having an input coupled to the antenna for amplifying and down-converting RF signals within a second frequency band. The radiotelephone further includes a first transmitter (44, 46, 48) having an output coupled to the antenna for up-converting and amplifying RF signals within the first frequency band and a second transmitter (44a, 46a, 48a) having an output coupled to the antenna for up-converting and amplifying RF signals within the second frequency band. In accordance with this invention the first receiver and the second transmitter are disposed within a first circuit package (29a), and the second receiver and the first transmitter are disposed within a second circuit package (29b). The first and second circuit packages may be integrated circuits or hybrid (e.g., thick or thin film) circuits.

13 Claims, 3 Drawing Sheets

DUAL BAND MOBILE STATION EMPLOYING CROSS-CONNECTED TRANSMITTER AND RECEIVER CIRCUITS

FIELD OF THE INVENTION

This invention relates generally to radiotelephones and, in particular, to dual band radiotelephones or mobile stations such as those capable of operation with a cellular network.

BACKGROUND OF THE INVENTION

The demand for so called dual mode terminals or stations is expected to increase with time. In the United States of America there is presently at least one system which supports dual mode operation, i.e., digital TDMA and analog FM (IS-136). As the systems such as GSM, PCS, and DECT become more widely used there is expected to be a need to have mobile stations which support two modes of operation, such as GSM and PCS, or GSM and DECT. A proposed third generation mobile telecommunication systems, such as UMTS (in ETSI) or FPLMTS (in CCIR), is under development, and these systems will most likely also require some type of dual mode operation.

When discussing a dual mode telecommunications system there are several different ways to define what is meant by "dual mode". The modes between which switching is possible may be analog/digital, or low/high carrier bit rate, or frequency/time division duplex (FDD/TDD), or simply from one frequency band to another. Various combinations of these parameters can also be encompassed by a dual mode mobile station (e.g., analog/digital and frequency band 1/frequency band 2). In this patent application the parameters of most interest are duplexing mode and/or frequency band changes.

In many mobile stations a number of discrete semiconductor devices are used to construct the radio frequency (RF) circuitry of the transmitter and receiver. However, when multiple frequency bands are required, a mobile phone manufacturer is presented with the problem of fitting the electronics, and especially radio frequency circuits, into a convenient and small volume package or case. To avoid an increase in the size of a handheld mobile station, some integration of components is preferably accomplished.

The use of integrated RF circuits is one common technique to save space while reducing the packaging volume and power consumption of the handheld mobile station. However, problems arise when the same integrated circuit is used for both analog and digital mode transmissions due to cross-talk problems within the integrated circuit. This cross-talk problem is compounded when a multiple frequency band architecture is employed. Although described primarily in the context of integrated circuits, the same problems can exist when using thick film or thin film hybrid RF circuit packages.

The frequency bands of interest may be widely spaced apart (e.g., 800 MHz and 1900 MHz), or they may be quite close together and even overlapping. Furthermore, within a band of interest, and for a duplex mode such as is used in conventional AMPS, transmission and reception occurs simultaneously at two different frequencies. This is a most troublesome case, as cross-talk between the transmitter and receiver circuitry degrades the voice and signalling quality of the mobile station.

OBJECTS OF THE INVENTION

It is thus a first object of this invention to provide an improved dual band radiotelephone that employs integrated circuit packages for transmit and receive functions.

It is another object of this invention to provide an improved dual band mobile station that employs cross-connected transmit and receiver signal paths through integrated circuits.

SUMMARY OF THE INVENTION

The foregoing and other problems are overcome and the objects of the invention are realized by a mobile station constructed in accordance with embodiments of this invention.

A multi-mode radiotelephone includes at least one antenna for transmitting and receiving RF signals within at least two frequency bands. The radiotelephone also includes a first receiver having an input coupled to the antenna for amplifying and down-converting RF signals within a first frequency band and a second receiver having an input coupled to the antenna for amplifying and down-converting RF signals within a second frequency band. The radiotelephone further includes a first transmitter having an output coupled to the antenna for up-converting and amplifying RF signals within the first frequency band and a second transmitter having an output coupled to the antenna for up-converting and amplifying RF signals within the second frequency band.

In accordance with this invention the first receiver and the second transmitter are disposed within a first circuit package (i.e., are cross-connected), and the second receiver and the first transmitter are disposed within a second circuit package and are likewise cross-connected. The first and second circuit packages may be integrated circuits or hybrid circuits.

In a presently preferred embodiment the radiotelephone also includes a first local oscillator for use with the first frequency band, a second local oscillator for use with the second frequency band, and a switch assembly for switchably coupling an output of either the first local oscillator or the second local oscillator to the first and second circuit packages.

The radiotelephone also includes a first duplexer for coupling the first receiver and the first transmitter to the antenna and a second duplexer for coupling the second receiver and the second transmitter to the antenna.

It is also within the scope of this invention to provide switches for selectively applying operating power to only one of the first receiver and the second receiver while also applying operating power to only one of the first transmitter and the second transmitter.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
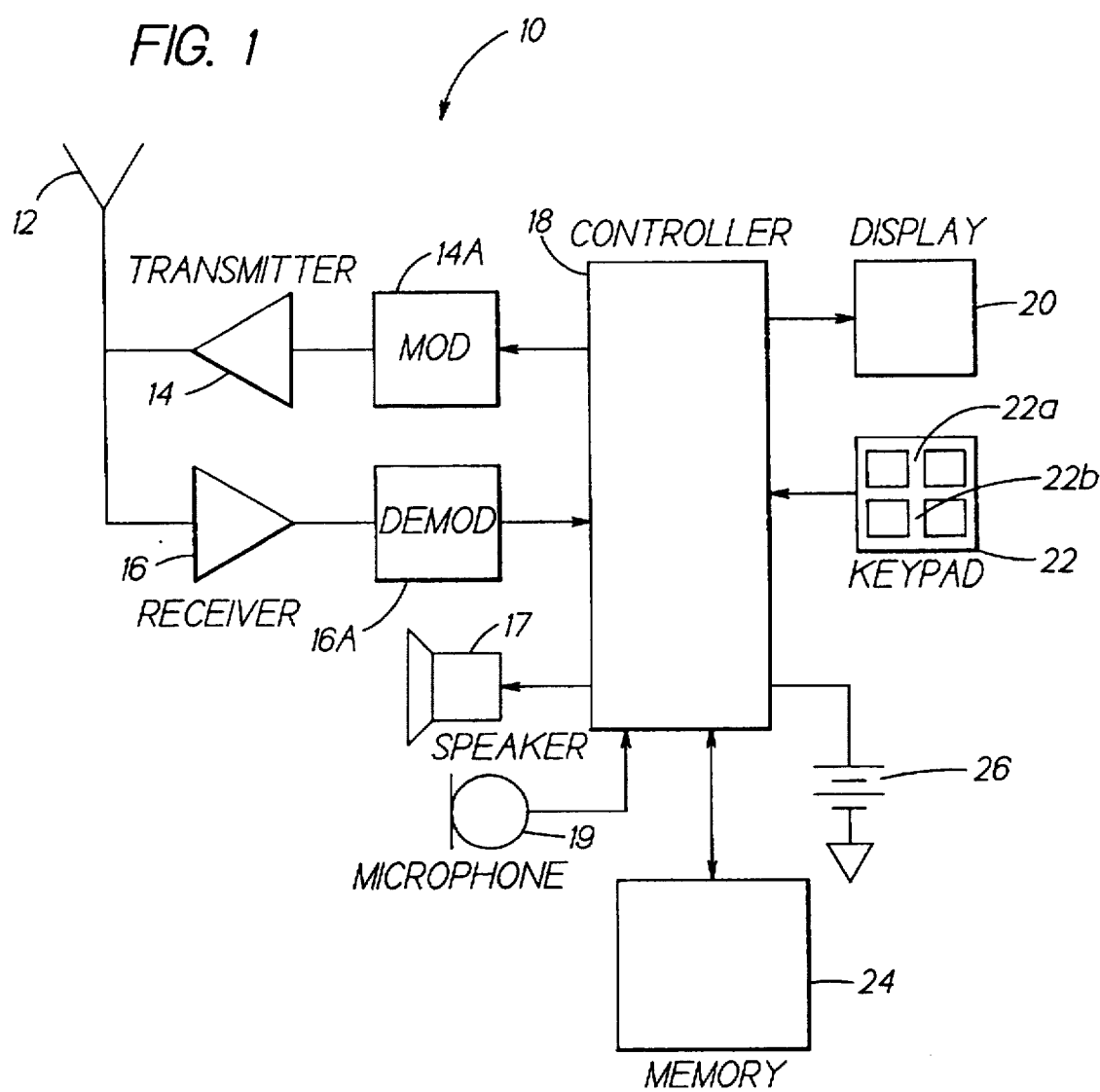
FIG. 1 is a block diagram of a mobile station that is constructed and operated in accordance with this invention.
Figure 2:
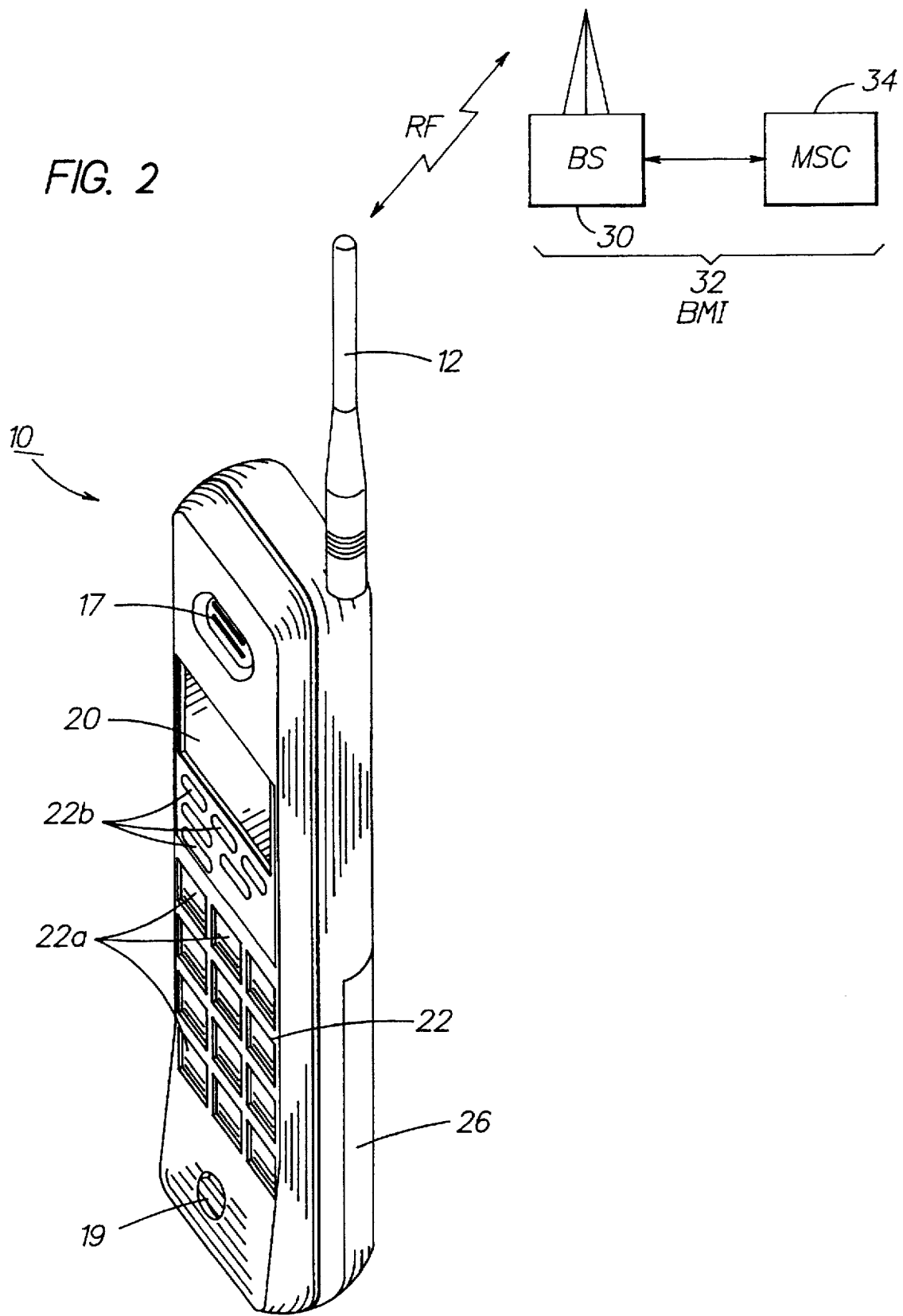
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a dual mode cellular radiotelephone or a personal communicator, that is suitable for practicing this invention. The dual mode mobile station 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile station 10 is registered with the network. The dual mode mobile station 10 is capable of establishing wireless communications using, by example, different modulation types (e.g., π/4-DQPSK and FM) and possibly also different frequency bands (e.g., 800 MHz AMPS or TDMA and 1900 PCS). Digital TDMA, digital CDMA, hybrid TDMA/CDMA, and duplex analog FM mobile stations are all within the scope of the teaching of this invention.

As such, the mobile station 10 may include a dual mode modulator (MOD) 14a, transmitter 14, receiver 16, demodulator (DEMOD) 16a. A controller 18 provides signals to and receives signals from the transmitter 14 and receiver 16, respectively. These signals include signalling information in accordance with the air interface standard of the applicable cellular system, and also user speech and/or user generated data.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The mobile station 10 also includes a battery 26 for powering the various circuits that are required to operate the station.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of standards including IS-91, IS-136, GSM, DECT, PCS, UMTS, FPLMTS and IS-95. Narrow-band AMPS (NAMPS), as well as TACS, mobile stations may also benefit from the teaching of this invention. It should thus be clear that the teaching of this invention is not to be construed to be limited to any one particular type of mobile station or air interface standard.

Figure 3:
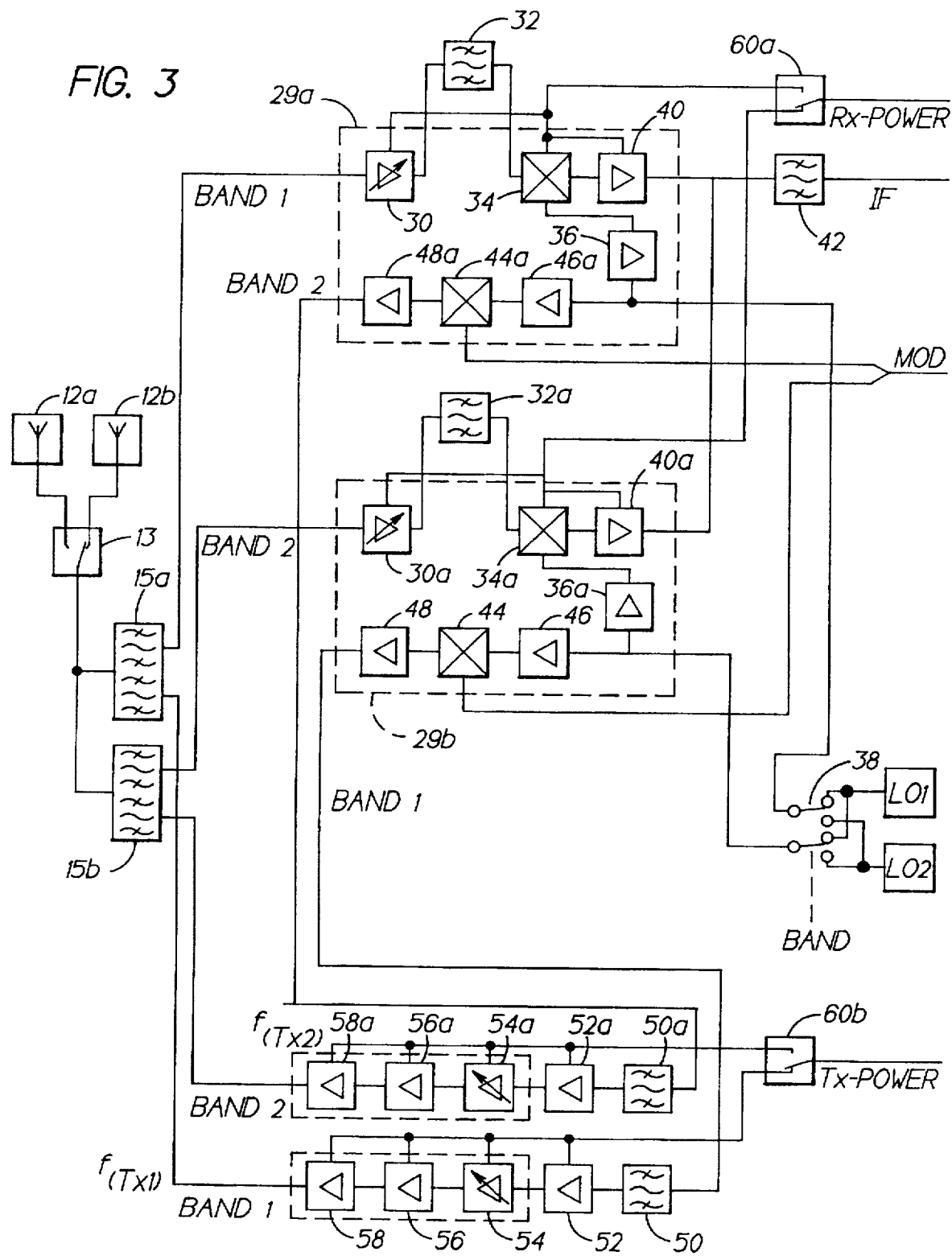
FIG. 3 is a schematic diagram of transmit and receiver circuitry in accordance with an embodiment of this invention.

Reference is now made to FIG. 3 for illustrating in greater detail the transmitter 14 and receiver 16 circuitry shown in FIG. 1.

FIG. 3 illustrates a dual band transmitter/receiver (transceiver) portion of the mobile phone 10. Although described in the context of two frequency bands, the teaching of this invention can be readily extended to three or more frequency bands. The signal for Band1 is received by the antenna 12. The antenna 12 is shown as two antennas 12a and 12b which can be switched by switch 13 when the transceiver band is changed. A single wideband antenna can also be used, thereby eliminating switch 13. The received Band1 signal is passed through a Band1 duplexer 15a to a Band1 low noise amplifier (LNA) 30. The output of the LNA 30 is applied to a bandpass filter 32 and then to an RF down-conversion mixer 34. The mixer 34 is fed a first local oscillator (LO1) signal through a buffer 36. The input of buffer 36 is derived from a LO switching arrangement 38. The output of mixer 34 is a first intermediate frequency (IF) signal that is applied to an IF buffer 40 which provides an output to an IF bandpass filter 42. The mixer 34 operates to down-convert the received Band1 signal to the first IF, which is equal to a difference frequency between Band1 and LO1. The Band2 receive circuitry 30a, 32a, 34a, 36a and 40a operates identically, except for using a second local oscillator (LO2) frequency.

It should be noted that the Band1 and Band2 receive circuitry is disposed in separate integrated circuit packages 29a and 29b.

In accordance with this invention the Band1 transmitter up-conversion mixer 44 is located in the integrated circuit package 29b that contains the Band2 receive circuitry. In like manner, the Band2 transmitter up-conversion mixer 44a is located in the integrated circuit package 29a that contains the Band1 receive circuitry. In this manner the Band1 and Band2 circuits are considered to be "cross-connected", thereby eliminating signal cross-talk between the transmit and receive circuitry during duplex operation. That is, if the Band1 down-conversion mixer 34 and the Band1 up-conversion mixer 44, along with their associated amplifiers, were located in the same integrated circuit package, undesirable signal cross-talk could exist between these circuits during duplex operation (i.e., during the simultaneous use of the receiver and transmitter circuitry). The same applies to the Band2 circuitry. The teaching of this invention overcomes these problems by cross-connecting the circuitry as is shown in FIG. 3.

Continuing now with the discussion of the transmitter circuitry, the transmit path for Band1 includes a LO1 buffer 46 which feeds the buffered LO1 injection signal to the up-conversion mixer 44. A modulating input signal (MOD) obtained from block 14a in FIG. 1, representing speech, data, and/or signalling information, is applied to a second input of the up-conversion mixer 44. An output of mixer 44 is applied to a buffer amplifier 48 which has an output connected to an output terminal of the integrated circuit 29b. The buffered Band1 signal is next applied to a Band1 power amplifier section that includes a bandpass filter 50, a buffer amplifier 52, a variable gain amplifier (VGA) 54, and power amplifiers 56 and 58. The output of the power amplifiers is a Band1 transmitted frequency $f_{TX1}$ that is applied to the Band1 duplexer 15a and thence to the appropriate antenna 12a or 12b. The Band2 transmit circuitry is constructed identically, except for the use of LO2 for the up conversion mixer 44a and the use of the Band2 duplexer 15b.

Also shown in FIG. 3 are power switching circuits 60a and 60b for selectively supplying operating power to the Band1 and Band2 circuits located in the integrated circuits 29a and 29b, it being assumed for this embodiment that separate power terminals are provided for the receive and transmit sections. In this manner the mobile station 10 powers down or powers off the transmitter and receiver circuitry of the frequency band that is not currently being used.

Although described in the context of preferred embodiments, it should be realized that a number of modifications to these teachings may occur to one skilled in the art. By example, and as was discussed above, the teaching of this invention applies to multi-mode devices capable of operation in two or more frequency bands. Also, the teaching of this invention is not restricted for use with transceiver integrated circuits, but can be applied as well to hybrid circuit packages, such as those wherein discrete integrated circuit chips are mounted to an insulating substrate and interconnected using thick film or thin film conductive traces. Also, the contents of the integrated circuit packages are illustrative. In other embodiments of this invention more or less than the number and types of circuit components may be employed. By example, the LO buffer amplifiers 36 and 46 could be provided external to the package. Also, although described in the context of handheld or vehicle mounted mobile station, it should be appreciated that the teaching of this invention applies as well to dual mode radiotelephone apparatus that is integrated into other components, such as wireless modems and facsimile devices, as well as to PCM-CIA modules and the like intended for installation and use with data processors.

It should be further noted that while the invention has been described in the context of two separate local oscillator signals (LO1 and LO2), it is within the scope of the teaching of this invention to employ a single local oscillator that can be used for both bands.

It is also within the scope of the teaching of this invention to employ a direct conversion or a direct modulation architecture wherein, for example, the RF carrier is directly mixed with audio or signalling information prior to transmission, thereby eliminating the requirement for the up-conversion mixer in the transmitter path. In such a system the down-conversion mixer may also be eliminated, thus making the first IF essentially the same as the received RF.

Thus, while the invention has been particularly shown and described with respect to preferred embodiments thereof, it will be understood by those skilled in the art that changes in form and details may be made therein without departing from the scope and spirit of the invention.

What is claimed is:

1. A multi-mode radiotelephone comprising a plurality of circuit packages, said multi-mode radiotelephone further comprising:
   at least one antenna for transmitting and receiving RF signals within at least two frequency bands;
   a first receiver having an input coupled to said at least one antenna for amplifying and down-converting RF signals within a first frequency band;
   a second receiver, different from said first receiver, having an input coupled to said at least one antenna for amplifying and down-converting RF signals within a second frequency band;
   a first transmitter having an output coupled to said at least one antenna for up-converting and amplifying RF signals within the first frequency band; and
   a second transmitter, different from said first transmitter, having an output coupled to said at least one antenna for up-converting and amplifying RF signals within the second frequency band; wherein
      said first receiver and said second transmitter are disposed within a first circuit package, and said second receiver and said first transmitter are disposed within a second circuit package that is different from said first circuit package.

2. A multi-mode radiotelephone as set forth in claim 1, wherein said first circuit package and said second circuit package are each an integrated circuit package.

3. A multi-mode radiotelephone as set forth in claim 1, wherein said first circuit package and said second circuit package are each a hybrid circuit package employing at least one of thick film or thin film interconnects.

4. A multi-mode radiotelephone as set forth in claim 1, and further comprising:
   a first local oscillator for use with the first frequency band;
   a second local oscillator for use with the second frequency band; and
   means for switchably coupling an output of either the first local oscillator or the second local oscillator to the first and second circuit packages.

5. A multi-mode radiotelephone as set forth in claim 1, and further comprising:
   a first duplexer for coupling said first receiver and said first transmitter to said at least one antenna; and
   a second duplexer for coupling said second receiver and said second transmitter to said at least one antenna.

6. A multi-mode radiotelephone as set forth in claim 1, and further comprising:
   a first switch means for selectively applying operating power to only one of said first receiver and said second receiver; and
   a second switch means for selectively applying operating power to only one of said first transmitter and said second transmitter.

7. A dual mode mobile station comprising a plurality of integrated circuit packages, said dual mode mobile station further comprising:
   at least one antenna for transmitting and receiving RF signals within at least two frequency bands;
   a first local oscillator (LO1) for use with a first frequency band (Band1);
   a second local oscillator (LO2) for use with a second frequency band (Band2);
   a first receiver having an input coupled to said at least one antenna for amplifying and down-converting RF signals, within Band1, to a Band1 first intermediate frequency (IF1), the first receiver being switchably coupled to an output of LO1 for outputting IF1 to be a difference frequency between the frequency of Band1 and the frequency of LO1;
   a second receiver, different from said first receiver, having an input coupled to said at least one antenna for amplifying and down-converting RF signals, within Band2, to a Band2 first intermediate frequency (IF2), the second receiver being switchably coupled to an output of LO2 for outputting IF2 to be a difference frequency between the frequency of Band2 and the frequency of LO2;
   a first transmitter having an output coupled to said at least one antenna for up-converting and amplifying RF signals, within Band1, to a Band1 transmitted frequency ($f_{TX1}$), the first transmitter being switchably coupled to the output of LO1 for outputting $f_{TX1}$ to be centered on the frequency of LO1; and
   a second transmitter, different from said first transmitter, having an output coupled to said at least one antenna for up-converting and amplifying RF signals, within Band2, to a Band2 transmitted frequency ($f_{TX2}$), the first transmitter being switchably coupled to the output of LO2 for outputting $f_{TX2}$ to be centered on the frequency of LO2; wherein
      said first receiver and said second transmitter are disposed within a first integrated circuit package, and said second receiver and said first transmitter are disposed within a second integrated circuit package, and wherein said first integrated circuit package is different from said second integrated circuit package.

8. A dual mode mobile station as set forth in claim 7, and further comprising:
   a first duplexer for coupling said first receiver and said first transmitter to said at least one antenna; and
   a second duplexer for coupling said second receiver and said second transmitter to said at least one antenna.

9. A dual mode mobile station as set forth in claim 7, and further comprising:
   a first switch means for selectively applying operating power to only one of said first receiver and said second receiver; and
   a second switch means for selectively applying operating power to only one of said first transmitter and said second transmitter.

10. A dual mode mobile station comprising a plurality of integrated circuit packages, said dual mode mobile station further comprising:
    at least one antenna for transmitting and receiving RF signals within at least two frequency bands;
    a first receiver having an input coupled to said at least one antenna for amplifying RF signals, within a first frequency band (Band1), and for outputting a Band1 first intermediate frequency (IF1);
    a second receiver, different from said first receiver, having an input coupled to said at least one antenna for amplifying RF signals, within a second frequency band (Band2), and for outputting a Band2 first intermediate frequency (IF2);
    a first transmitter having an output coupled to said at least one antenna for amplifying RF signals and for outputting a Band1 transmitted frequency ($f_{TX1}$); and
    a second transmitter, different from said first transmitter, having an output coupled to said at least one antenna for amplifying RF signals and for outputting a Band2 transmitted frequency ($f_{TX2}$); wherein
    at least a portion of said first receiver and said second transmitter are disposed within a first integrated circuit package, and at least a portion of said second receiver and said first transmitter are disposed within a second integrated circuit package, and wherein said first integrated circuit package is different from said second integrated circuit package.

11. A multi-band mobile station comprising a plurality of discrete circuit packages and at least one antenna for transmitting and receiving RF signals within at least two frequency bands, said multi-band mobile station further comprising:

at least first and second cross-connected transceivers comprised of
   a first receiver having an input coupled to said at least one antenna for amplifying received RF signals, within a first frequency band (Band1), said first receiver comprising a first down-conversion mixer for down-converting the received RF signals in Band1 and for outputting a Band1 first intermediate frequency (IF1);
   a second receiver, different from said first receiver, having an input coupled to said at least one antenna for amplifying received RF signals, within a second frequency band (Band2), said second receiver comprising a second down-conversion mixer for down-converting the received RF signals in Band2 and for outputting a Band2 first intermediate frequency (IF2);
   a first transmitter having an output coupled to said at least one antenna for amplifying RF signals, said first transmitter comprising a first up-conversion mixer for up-converting a first input RF signal and for outputting a Band1 transmitted frequency ($f_{TX1}$); and
   a second transmitter, different from said first transmitter, having an output coupled to said at least one antenna for amplifying RF signals, said second transmitter comprising a second up-conversion mixer for up-converting a second input RF signal and for outputting a Band2 transmitted frequency ($f_{TX2}$); wherein
   at least a portion of said first receiver and said second transmitter, including said first down-conversion mixer and said second up-conversion mixer, are disposed within a first discrete circuit package, and at least a portion of said second receiver and said first transmitter, including said second down-conversion mixer and said first up-conversion mixer, are disposed within a second, different discrete circuit package.

12. A multi-band mobile station as set forth in claim 11, wherein said first discrete circuit package and said second discrete circuit package are each comprised of an integrated circuit package.

13. A multi-band mobile station as set forth in claim 11, wherein said first discrete circuit package and said second discrete circuit package are each comprised of a hybrid circuit package employing at least one of thick film or thin film interconnects.

* * * * *